United States Patent
Bevilacqua

(10) Patent No.: US 10,564,422 B1
(45) Date of Patent: Feb. 18, 2020

(54) COGNITIVE FUNCTION IMPROVEMENT SYSTEM AND METHOD

(71) Applicant: Andy Bevilacqua, Huntsville, AL (US)

(72) Inventor: Andy Bevilacqua, Huntsville, AL (US)

(*) Notice: Subject to any disclaimer, the term of this patent is extended or adjusted under 35 U.S.C. 154(b) by 0 days.

(21) Appl. No.: 16/281,095

(22) Filed: Feb. 21, 2019

Related U.S. Application Data

(63) Continuation-in-part of application No. 15/409,518, filed on Jan. 18, 2017, now abandoned, and a continuation-in-part of application No. 15/095,824, filed on Apr. 11, 2016, now Pat. No. 10,242,584.

(60) Provisional application No. 62/146,050, filed on Apr. 10, 2015.

(51) Int. Cl.
*G02B 27/01* (2006.01)
*G06F 3/01* (2006.01)
*G06F 3/14* (2006.01)

(52) U.S. Cl.
CPC ............ *G02B 27/017* (2013.01); *G06F 3/011* (2013.01); *G06F 3/1423* (2013.01)

(58) Field of Classification Search
CPC ........... A61B 3/024; A61B 3/028; G09G 5/00
See application file for complete search history.

(56) References Cited

U.S. PATENT DOCUMENTS

| | | | |
|---|---|---|---|
| 2011/0001790 A1* | 1/2011 | Marin ................ | G02B 27/017 348/42 |
| 2012/0154751 A1* | 6/2012 | Pelah ................. | A61B 3/0041 351/224 |
| 2013/0155096 A1* | 6/2013 | Legair-Bradley ..... | G06F 3/1423 345/619 |
| 2016/0351069 A1* | 12/2016 | Faubert ............ | G09B 19/0038 |
| 2017/0036106 A1* | 2/2017 | Stechschulte ......... | A63F 13/85 |

* cited by examiner

Primary Examiner — James S. McClellan
(74) Attorney, Agent, or Firm — Chris Tanner; TannerPatent.com

(57) ABSTRACT

The present disclosure relates generally to altering the cognitive load in an individual to affect the information and task processing of that individual. Specifically introducing movement in the peripheral visual field of the individual reduces the cognitive load, thereby allowing the user to be more efficient at the primary task or information processing. Included is a system comprising a support that is shaped to be positioned in front of a user and in the field of vision of the user. A central display screen is attached to the support and positioned proximate the central vision of the user. A computer readable memory medium is accessible by a processor and to instruct the central display screen to display both repetitive, non-biological movement and either information or an operating task on the central display screen.

17 Claims, 10 Drawing Sheets

Time vs Gender

Time vs Movement Type

Time vs Contrast of the Movement on the display

Fig. 10

Correlations

|  |  | Meantime | AGE |
|---|---|---|---|
| Meantime | Pearson Correlation | 1 | .338** |
|  | Sig. (2-tailed) |  | .001 |
|  | N | 100 | 100 |
| AGE | Pearson Correlation | .338** | 1 |
|  | Sig. (2-tailed) | .001 |  |
|  | N | 100 | 100 |

**. Correlation is significant at the 0.01 level (2-tailed).

Age is a Strong Covariate for Time vs Task

COGNITIVE FUNCTION IMPROVEMENT SYSTEM AND METHOD

This is a non-provisional patent application filed by inventor Andy Bevilacqua, a citizen of the United States, residing at Huntsville, Ala., for the invention of a "Cognitive Function Improvement System and Method", wherein this application claims priority to U.S. patent application Ser. No. 15/409,518 filed Jan. 18, 2017 and entitled "Cognitive Function Improvement System and Method", and claims priority to U.S. patent application Ser. No. 15/095,824 filed Apr. 11, 2016 and entitled "Cognitive Function Improvement System and Method", which claims priority to U.S. Provisional Patent Application Ser. No. 62/146,050 filed Apr. 10, 2015 and entitled "Cognitive Function Improvement System and Method," all of which are incorporated herein by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND

Technical Field

The current disclosure relates to methods and systems for the Cognitive Function Improvement in a user of the systems. More specifically, the current disclosure relates to a method, system, and apparatus to reduce the cognitive load in users with the introduction of non-biological repetitive movement in the far peripheral visual field.

Background of the Disclosure

Cognitive psychology, including the cognitive load, refers to the total amount of mental effort being used in the working memory. Cognitive load theory is a concept that the instructional design by an instructor, teacher, professor or the like can be configured in order to reduce the cognitive load in learners. The concept is based upon the desire to ease the mental effort needed process information including, cognitive tasks, learnings, processing, etc. In theory, a heavy cognitive load will have a negative effect on the completion of other metal task, thus making it harder for that individual to process information. While the experience of cognitive load varies among individuals, research has shown that elderly, school aged students, and children experience cognitive load differently and typically at higher levels. The idea is a proper cognitive load will assist in the presentation of information in a manner that encourages the viewer or learner of that information to optimize their intellectual performance.

According to Cognitive load theory (CLT) human working memory is limited in both its capacity to store information and the duration with which it can be stored. Within working memory sensory processing, i.e. visual, auditory and tactile information is processed before being passed on to long-term memory in the form of categorical information (such as schemas) for encoding and storage. According to CLT, as immediate sensory inputs aggregate, they tend to fill up the available processing space within working memory, resulting in a decrease in efficiency within the entire memory system. Conventional research offers that these elements of load can have severe implications with reference to an individual's learning ability, memory retention and general problem solving ability. In CLT, one would expect a peripheral task-irrelevant stimulus to impose an extraneous cognitive load and reduce task performance, under the assumption that the cognitive task is complex.

Recent updates of CLT suggest that the processing of biologically primary knowledge may not be affected as much by the spatial and temporal limitations of working memory, as processing of other types of knowledge. According to this research, the main source of cognitive load is biologically secondary knowledge, that is knowledge humans were not biologically developed to acquire, and most of which we learn at school, university, or in the work place. Examples include learning to read and write. Biologically primary knowledge is knowledge that is fundamental to human survival and development, and which has developed over a long period of time. Examples include face recognition, walking and learning to speak our own language. If preferential processing is given to biologically primary knowledge as conventional researchers posit, then one could reasonably expect that the detection of movement in the far periphery, which can be considered a biologically primary stimuli, would also receive preference and impose a higher cognitive load.

Another area of conventional theory is directed at far field peripheral processing and its effects on the load theory of selective attention and cognitive control. This theory is an extension of perceptual load theory and deals primarily with the visual cognitive load induced by the attentional perceptual processing of visual information. One of the central issues addressed by this research is the problem of distractors within the peripheral field of view, and the effect of perceptual cognitive load on a person's ability to consciously process the presence of a distractor. A distractor can be classified as any type of movement within the field of view of the eye. According to the perceptual load model proposed by conventional researchers, sensory responses to distractors within the field of view are only noticed when load of the main perceptual task is low, and when the processing of the distractors is relevant for the stimuli to be processed in the main perceptual task. According to the researchers, responses to these distractors are reduced the more the processing load of the main perceptual task increases. These findings appear to be supported by fMRI studies that show motion-related activity is reduced in the cortical V5 region of the brain during high cognitive load tasks. Despite these corroborating results, there is still much debate within the scientific community regarding the actual cognitive mechanisms behind the outcomes of these experiments.

Another issue concerns the lack of experimentation in the far peripheral field. The common method used in most of the experiments supporting perceptual load theory is to use either a field of dots moving from the center of the field of view towards the edge of a computer screen or a distractor just outside of the central field of the eye in the parafoveal or near peripheral field.

Conventional research shows that because the biological functions of foveal and peripheral vision are so different, the processing of the information collected by these areas actually takes place within separate regions of the brain, making far peripheral processing an idiosyncratic process. This could mean that far peripheral field processing is not bound by selective attention in the same way foveal and parafoveal vision seems to be. Under the perceptual load theory one would expect the peripheral stimulus to have no effect if the cognitive task is complex. This leaves open the question regarding whether movement within the far peripheral field (50-90 degrees) will produce measurable cognitive load outside of human selective attention. Conventional research has offered that specialized movement in the far peripheral field will be processed regardless of selective attention and these processed inputs should induce a measurable cognitive load on working memory even in the absence of selective attention.

Another factor in the processing of information is specifically the anatomy of the eye and what the eye can see. A person usually has what is called a field of vision or a visual field. This is usually measured in terms of degrees from a center point that is typically aligned horizontally with the nose on the head and typically aligned vertically with the center point of the eyes on the head. Various research gives different degrees of measurement but typically have approximate ranges. Typically, the research shows that each eye can see in a range of approximately 120 degrees of an arc in a horizontal field. Most of that arc is defined as peripheral vision and the human brain and eye in conjunction do not always process information in the peripheral vision areas in the same manner as information received in the center of vision for that individual. The center vision, which can also be classified as the center of gaze, typically coordinates with the center of the person's face and has a range of about 20 degrees either side of the center of the vision.

The peripheral vision can be broken down into near peripheral vision which is the vision just adjacent to the center of vision, mid-peripheral vision which is beside the near peripheral vision and then far peripheral vision which is at the edge of the field of view. With healthy and normal eyes, using a zero degree base point as extending from the center of the head, the healthy eye should be able to see approximately 95 degrees temporally, or towards the ear, and approximately 60 degrees nasally, or towards the nose, as measured from that center zero location. Further, the healthy eye should be able to see 60 degrees above and 75 degrees below the vertical center line of each eye. As such, the horizontal field range is approximately 155 degrees and the vertical field range is approximately 135 degrees at any given time for each eye.

Again, in this range of vision, conventional research tends to show that movement and/or distractions in the peripheral vision areas will increase the cognitive load and thereby reduce the efficiency of the active task, such as learning or information processing. Alternatively non-biological movement, within the center of vision, where such task is the focus of that individual will either increase or decrease cognitive load depending on the characteristics of movement.

Additionally, when advertisements or messages are displayed on a display screen or other readable medium there is a need to manipulate (up or down) the cognitive load of individuals viewing the readable medium to assure that the individual reaches the desired understanding of the advertisement or message presented within the time available to view the advertisement or message. Therefore, it would be advantageous if the task performance of the individual could be manipulated (up or down) to increase or decrease the speed of understanding based upon the demographics of the observer, the time available to observe, and the objectives of the advertisement or message.

What is needed then is a new system, apparatus, and method of manipulating (either up or down) the cognitive load on an individual using movement somewhere from the center to the far periphery of vision to effect information processing, task processing, and mental performance of that individual as desired to meet a particular task demand. This needed system, apparatus, and method is lacking in the art.

BRIEF SUMMARY

The present disclosure relates generally to altering the cognitive load in an individual to affect the information and task processing of that individual. More specifically, the current disclosure relates to specifically introducing movement in different parts of the visual field to effect the cognitive load thereby allowing the user to be more or less efficient at the task or information processing.

In one embodiment, the current disclosure teaches a system for reducing the cognitive load in a user where the user has a field of vision, a center of vision, a right eye peripheral vision, and a left eye peripheral vision. This system comprises a support that is shaped to be positioned in front of the user and in the field of vision of the user. The first display screen is attached to the support and positioned in the right eye peripheral vision, while a second display screen is attached to the support and positioned in the left eye peripheral vision. A processor is operatively attached to the support, the first display screen and a second display screen. A computer readable memory medium is accessible by the processor and is configured to instruct the first display screen and the second display screen to display a repetitive, non-biological movement on the screens.

In this embodiment, the first display screen substantially blocks the right eye peripheral vision and a second display screen substantially blocks the left eye peripheral vision. The right eye peripheral vision includes a horizontal field range of approximately 100 degrees as measured from the center of vision and the left eye peripheral vision includes a horizontal field range of approximately 100 degrees as measured from the center of vision.

In an embodiment, the first display screen and second display screen block the peripheral visions from the right eye and left eye from approximately 20 to approximately 95 degrees. In another embodiment, the display screens block the peripheral vision from approximately 20 to approximately 90 degrees in each eye, respectively. In another embodiment, the display screens block the peripheral vision from approximately 50 degrees to approximately 90 degrees in each eye, respectively. In a most preferred embodiment, the display screens block the peripheral vision from approximately 70 degrees to approximately 90 degrees in each eye, respectively.

In an embodiment, the system further includes a third display screen operatively attached to the support and the processor. The third display screen is positioned between the first display screen and second display screen proximate to the center of vision. The third display screen is for providing information or an operating task to the user.

In an embodiment, the processor is operatively attached to the third display screen and processor can access the computer readable memory medium to instruct the third display screen to display a repetitive, non-biological movement on the third display screen. The third display screen can be preferably positioned in the center vision, or the center of gaze. Again, this positioning typically coordinates with the center of the person's face and has a range of about 20 degrees either side of the center of the vision or center of the face. This display of the repetitive, non-biological movement on the third display screen is preferably positioned proximate to or generally behind the information or operating task provided to the user. In another embodiment, the third display screen, or central display screen, is the only display screen operatively attached to the processor.

Also enclosed is headwear for reducing the cognitive load in a user. Again, the user has a field of vision, center of vision, a right eye peripheral vision, and a left eye peripheral vision. The right eye peripheral vision and left eye peripheral vision have a horizontal field range of approximately 100 degrees measured from the center of vision. The headwear compromises a frame shaped to be positioned on the head of the user, and first and second display screens attached to the frame. The first display screen is positioned in the right eye peripheral vision to at least partially block the right eye peripheral vision. The second display is positioned in the left eye peripheral vision to at least partially block the left eye peripheral vision. A processor is operatively attached to the frame, the first display screen, and the second display screen. Computer readable memory medium is accessible by the processor and is configured to instruct the first display screen and the second display screen to display repetitive, non-biological movement.

The headwear can further include a third display screen operatively attached to the frame and the processor where the third display screen is positioned between the first and second display screens and proximate to the center of vision of the user. In an embodiment, the first display screen and second display screen block the peripheral vision in various ranges measured from the center of vision. For example, in one embodiment, this range is from 20 to 95 degrees. In a second embodiment, this range is from 20 to 90 degrees. In a third embodiment, this range is from 50 to 90 degrees. In a fourth embodiment, this range is from 70 to 90 degrees.

It is therefore a general object of the current disclosure to provide a system for reducing the cognitive load in an individual.

Another object of the current disclosure is to provide a method for reducing the cognitive load in an individual.

Still another object of the current disclosure is to provide headwear for reducing the cognitive load in a user of the headwear.

Another object of the current disclosure is to provide repetitive, non-biological movement in the peripheral vision of an individual to reduce the cognitive load on that individual to induce a higher level of task performance, information processing, memory functioning, and/or brain activity.

Another object of the current disclosure is to provide repetitive, non-biological movement in the center of vision of an individual to reduce the cognitive load on that individual to induce a higher level of task performance, information processing, memory functioning, and/or brain activity.

Another object of the current disclosure is to provide repetitive, movement in the center of vision of an individual to manipulate the cognitive load on that individual to induce a higher or lower level of task performance, information processing, memory functioning, and/or brain activity.

Other and further objects, features, and advantageous of the present disclosure will be readily apparent to those skilled in the art upon reading of the following disclosure when taken in conjunction with accompanying drawings.

BRIEF DESCRIPTION OF THE DRAWINGS

FIG. 10 is a chart showing age as a factor in the correlation of time to complete the task.

DETAILED DESCRIPTION

Figure 1:
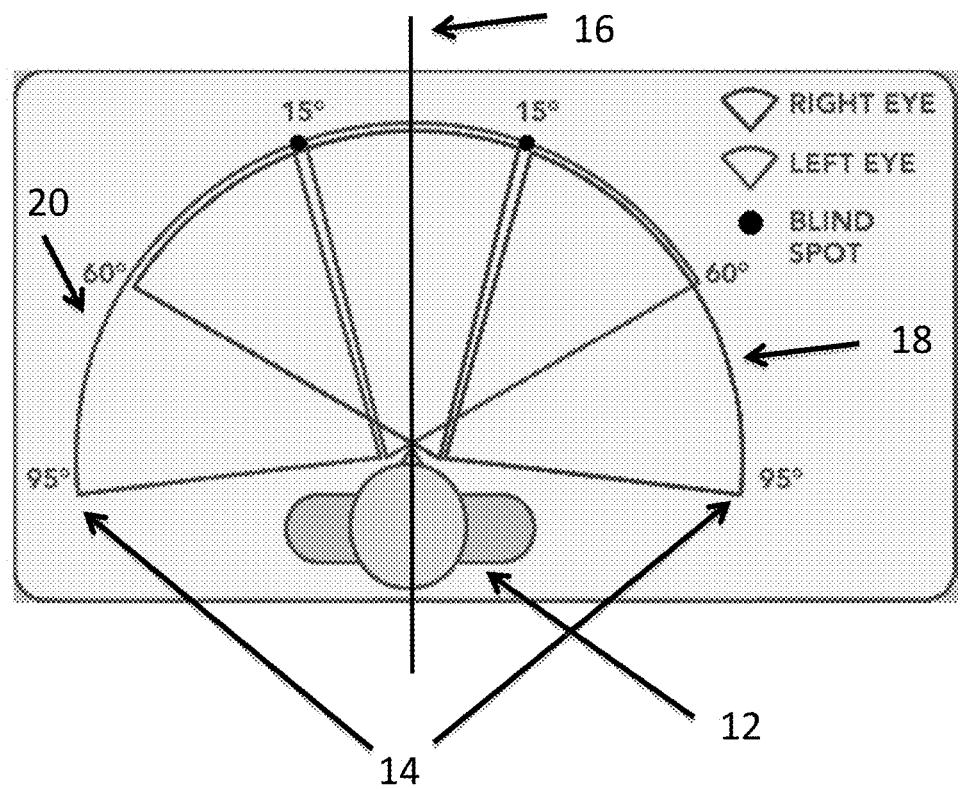
FIG. 1 is a general plan view of the field of vision of an average individual.
Figure 2:
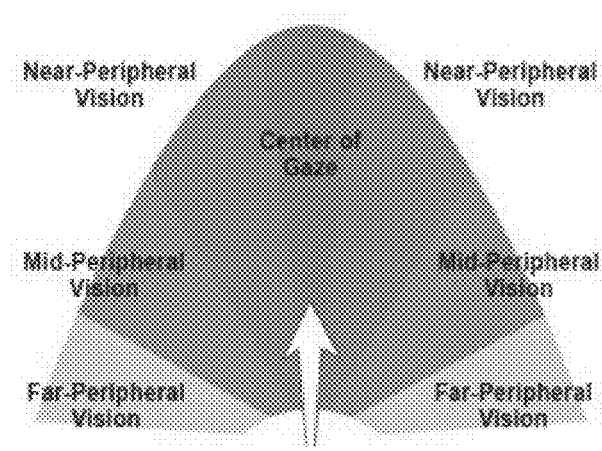
FIG. 2 is an image of a general breakdown of the peripheral vision portions in the average individual.
Figure 3:
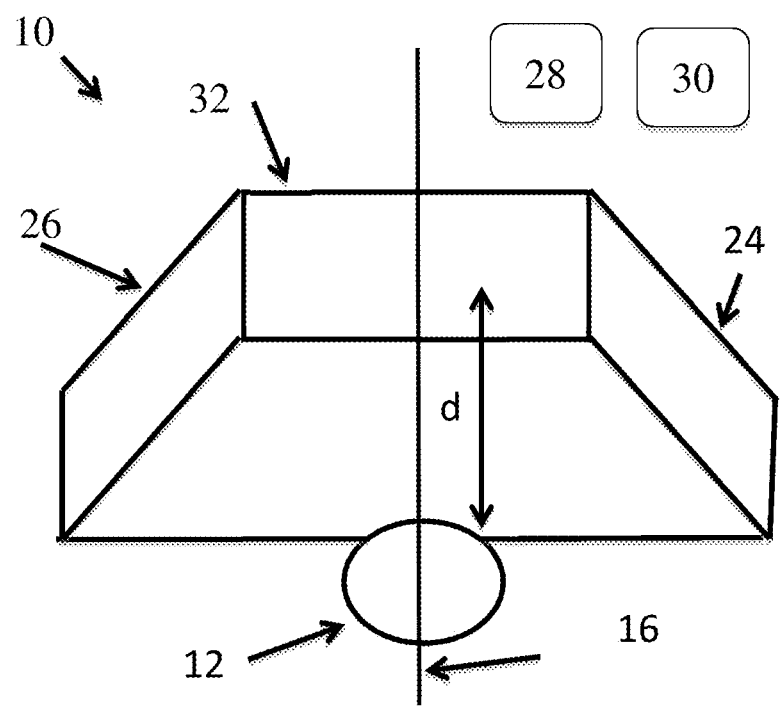
FIG. 3 is a schematic of a system made in accordance with current disclosure.

The term "computer-readable memory medium" as used herein may refer to any non-transitory medium alone or as one of a plurality of non-transitory memory media within which is embodied a computer program product that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The host server may be accessible by or otherwise linked to various external and third party platforms via a communications network and in accordance with these links is effective to collect, obtain, receive, transmit and/or share data using various communications protocols as are well known in the art. The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces as are known in the art.

The term "platform" as used herein may typically refer to a website, network, or alternative but equivalent interfaces for supporting multimedia interactivity consistent with the described features of the present invention.

Referring now to FIGS. 1-10, a system made in accordance with the current disclosure is shown and generically designated by the numeral 10. In this disclosure, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

The system 10 is for reducing the cognitive load in a user 12. The user has a field of vision 14, a center of vision 16, a right eye peripheral vision 18, and a left eye peripheral vision 20. The system 10 comprises a support 22 shaped to be positioned in front of the user 12 and proximate to the field of vision 14. A first display screen 24 is attached to the support 22 and positioned in the right eye peripheral vision 18. A second display screen 26 is attached to the support 22 and positioned in the left eye peripheral vision 20. A processor 28 is operatively attached to the support 22, the first display screen 24, and a second display screen 26. The processor 28 has access to computer readable memory 30 that is configured to instruct the first display screen 24 and the second display screen 26 to display repetitive, non-biological movement. A third display screen 32 can be operatively attached to the support 22 and the processor 28. The third display screen 32 is preferably positioned between the first display screen 24 and the second display screen 26 and proximate the center of vision 16.

In an embodiment, the processor 28 can use the computer readable memory 30 to instruct the third display screen to display either information or an operating task. Further, the processor 28 can use the computer readable memory 30 to instruct the third display screen to display a repetitive, non-biological movement on the third display screen proximate, around or behind the information or operating task.

In an embodiment, the first display screen 24 at least partially blocks the right eye peripheral vision 18 while the second display screen 26 at least partially blocks the left eye peripheral vision 20. In another preferred embodiment, the first display screen 24 substantially blocks the right eye peripheral vision 18, while the second display screen 26 substantially blocks the left eye peripheral vision 20. Generally, the right eye peripheral vision 18 and the left eye peripheral vision 20 each include a horizontal field range of vision of approximately 100 degrees as measured from the center of vision 16. Typically, the center of vision 16 starts at a 0 degree point at a position corresponding to the center of the head of the user 12. In an embodiment, the first display screen 24 blocks the right eye peripheral vision 18 in a range from approximately 20 to approximately 95 degrees as measured from the center of vision 16. In this embodiment, the second display screen 26 blocks the left eye peripheral vision 20 in a range from approximately 20 to approximately 95 degrees as measured from the center of vision 16. These measurements typically start at the center of vision 16 and are measured temporally towards either ear. In another embodiment, the first display screen 24 and the second display screen 26 block the right eye peripheral vision 18 and the left eye peripheral vision 20, respectively, in a range from approximately 20 to 90 degrees. In another embodiment, the first display screen 24 and the second display screen 26 block the right eye peripheral vision 18 and the left eye peripheral vision 20, respectively, in a range from 50 to 90 degrees as measured from the center of vision 16. In another embodiment, the first display screen 24 and the second display screen 26 block the right eye peripheral vision 18 and left eye peripheral vision 20, respectively, in a range from 70 to 90 degrees as measured from the center of vision 16.

Depending on the exact configuration of the first display screen 24 and second display screen 26, these display screens can block a portion of the peripheral vision of the opposite eye. For example, if these display screens 24 and 26 extend to a location that in within 60 degrees of the center of vision 16, the nasal peripheral vision of the opposite eye can also be blocked. For example, if the first display screen 24 extends to a position that is within approximately 60 degrees of the center of vision 16, the first display screen 24 can block a portion of the left eye peripheral vision 20. Correspondingly, if the second display screen 26 extends to a position that is within approximately 60 degrees of the center of vision 16, the second display screen 26 an block a portion of the right eye peripheral vision 18. As such, these display screens can also block temporal and nasal peripheral vision depending on their length and location with respect to a given eye of a user.

Additionally in this embodiment, the computer readable memory medium 30 along with the processor 28, can instruct the third display screen 32 to display information. Information can be generally defined as any type of information discernable by the user, including alpha-numeric characters, images, specific tasks and the like. As such, in this embodiment, the third display screen 32 can be used as a focus of the user 12, for any information, including but not limited to, education, learning, tasks, communications, and other various mental and cognitive functioning and interaction. As such, with the current system 10, the display screens 24 and 26 can reduce the cognitive load on the user 12 such that the user 12 can focus in on the third display screen 32 and have better brain functioning, learning, retention, interaction, and general cognitive and mental functioning.

In this system 10, the computer readable memory medium 30 through the processor 28 preferably instructs the display screens 24 and 26 to display repetitive, non-biological movement. This type of movement can be important in the reduction of the cognitive load. For example, there are four major types of movement: biological movement, non-biological movement, repetitive movement, and directional movement. Conventional research has offered that any movement in the peripheral vision range increases the cognizant load. The current inventor has discovered that of these four types of movement, certain movements actually do increase the cognitive load. Conversely, some of the movements actually reduce the cognitive load, thereby increasing the cognitive brain function on a desired task.

For example, the current inventor has discovered that the biological movement as well as directional movements in the peripheral vision areas tend to attract, at least on a subconscious level, the attention of an individual that perceives this movement, thereby taking some brain function away from the preferred task at hand. Conversely, however, the inventor has discovered that non-biological movement, especially in a repetitive manner, tends to have the individual focus more on the task at hand thereby reducing the cognitive load on that individual and allowing more cognitive learning and processing of the preferred task at hand. This has also proven effective when the repetitive, non-biological movement can block out the other biological and/or directional movement. The testing has shown that the repetitive movement in numerous directions can counteract the effect of a user's eyes preference for certain directional movement. For example, a wide variety of starbursts, or multiple line movements in various directions has proven to be preferred over a repetitive bouncing motion like in a pong game. The motions, while repetitive, need to be multidirectional repetitive. Additionally, testing has shown that a purely directional motion that is repeated was not as effective at significantly reducing the cognitively load as a repetitive multidirectional movement. Further, the non-biological aspect movement has been proven to be more effective than the biological movement. This can be due to various instincts in the user, such as survival instincts, that may take over when a biological movement is perceived in this peripheral vision area.

Figure 5:
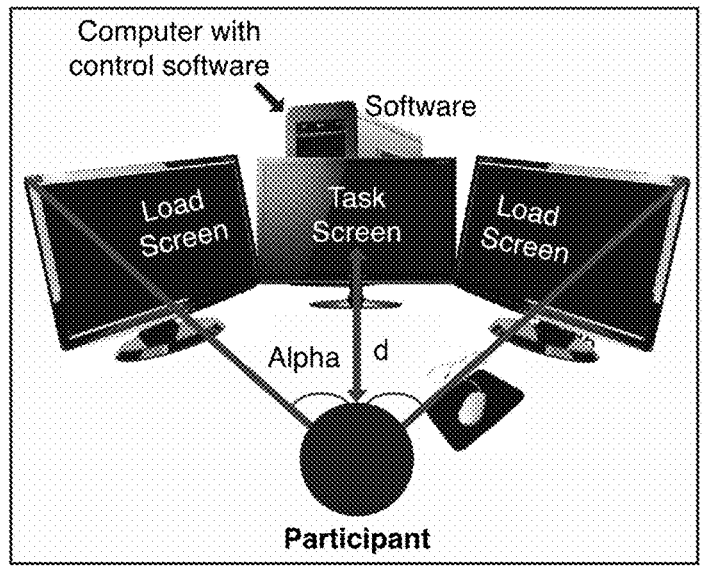
FIG. 5 is an example of a test system used by the inventor in accordance with the current disclosure.
Figure 6:
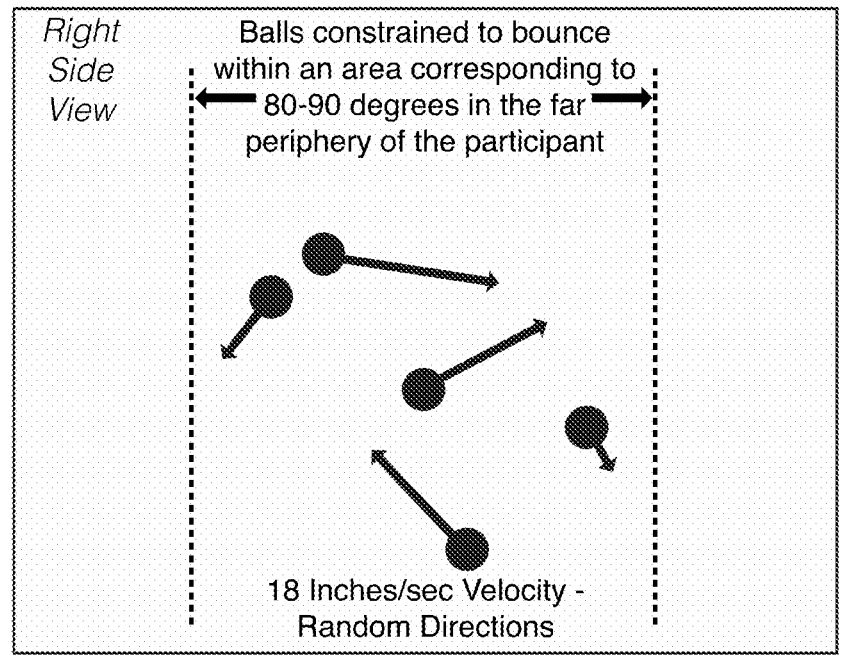
FIG. 6 is an example of the repetitive non-biological movement used in a test system in accordance with the current disclosure.

The inventor has performed tests to support this system and method of reducing the cognitive load. For example, in one experiment a total of 50 subjects participated and were set up with a system as generally shown in FIG. 5. The distance D was approximately 18" to 24" with each of the side displays situated at approximately 15" perpendicular from the center display. The experiment used a set of 5 moving balls that could be displayed at locations approximately 80 to 90 degrees from the center of vision 16. Please see FIG. 6. The participants were required to do a cognitive process/test on the center display. The elapsed times to complete those tasks were recorded. The results showed that when the repetitive non-biological movement, in this case the bouncing balls, was in the far peripheral vision of the user, that user completed the cognitive task at a statistically significant faster pace. Further, the data showed that male participants responded with a higher reduced cognitive load, when compared to the absence of the repetitive, non-biological movement, than females. As such, the current system could be focused on male cognitive load reduction, but could be proven to be statistically significant for females as well. The bouncing ball paradigm had both vertical and horizontal components to the movement as well as rapid changes in directions, but otherwise eye threshold information was used for the eye to have the ability to see colors, brightness, direction, and velocity changes.

Figure 7:
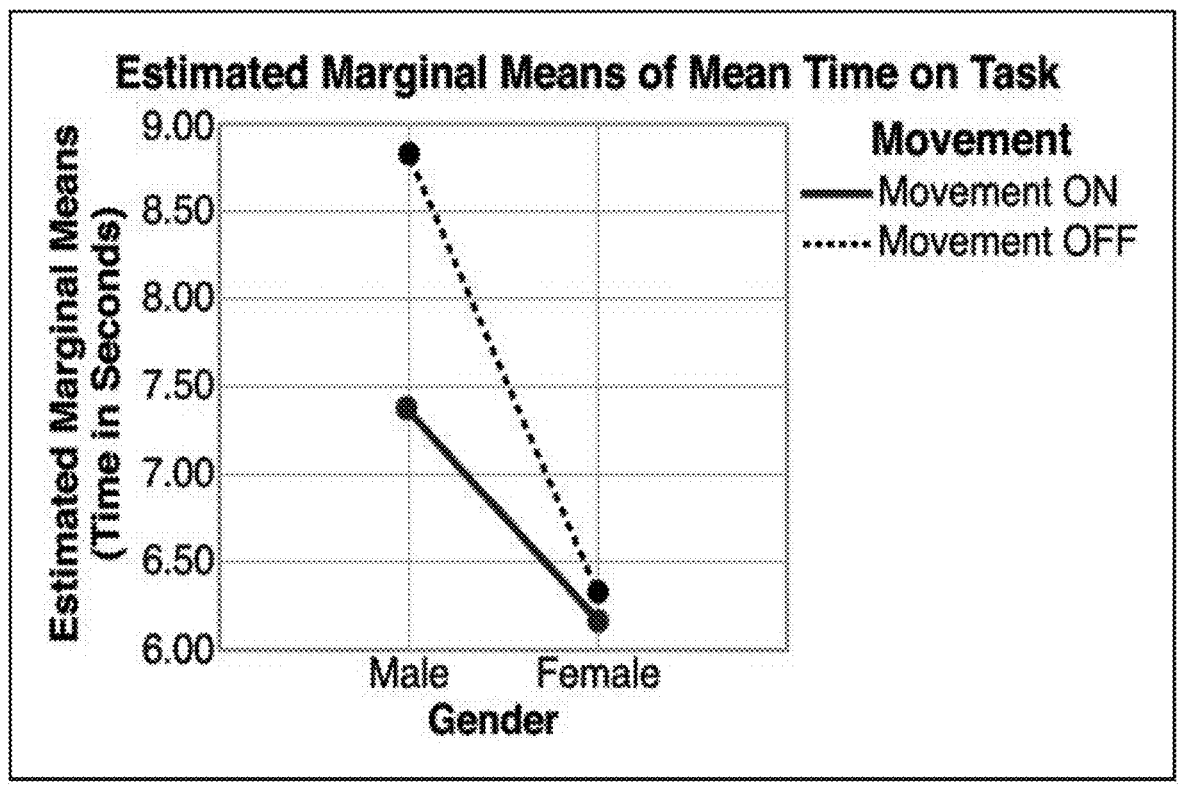
FIG. 7 is a chart showing the estimated marginal means of mean time to complete a task. The charts shows time for each gender both with and without non-biological movement.
Figure 8:
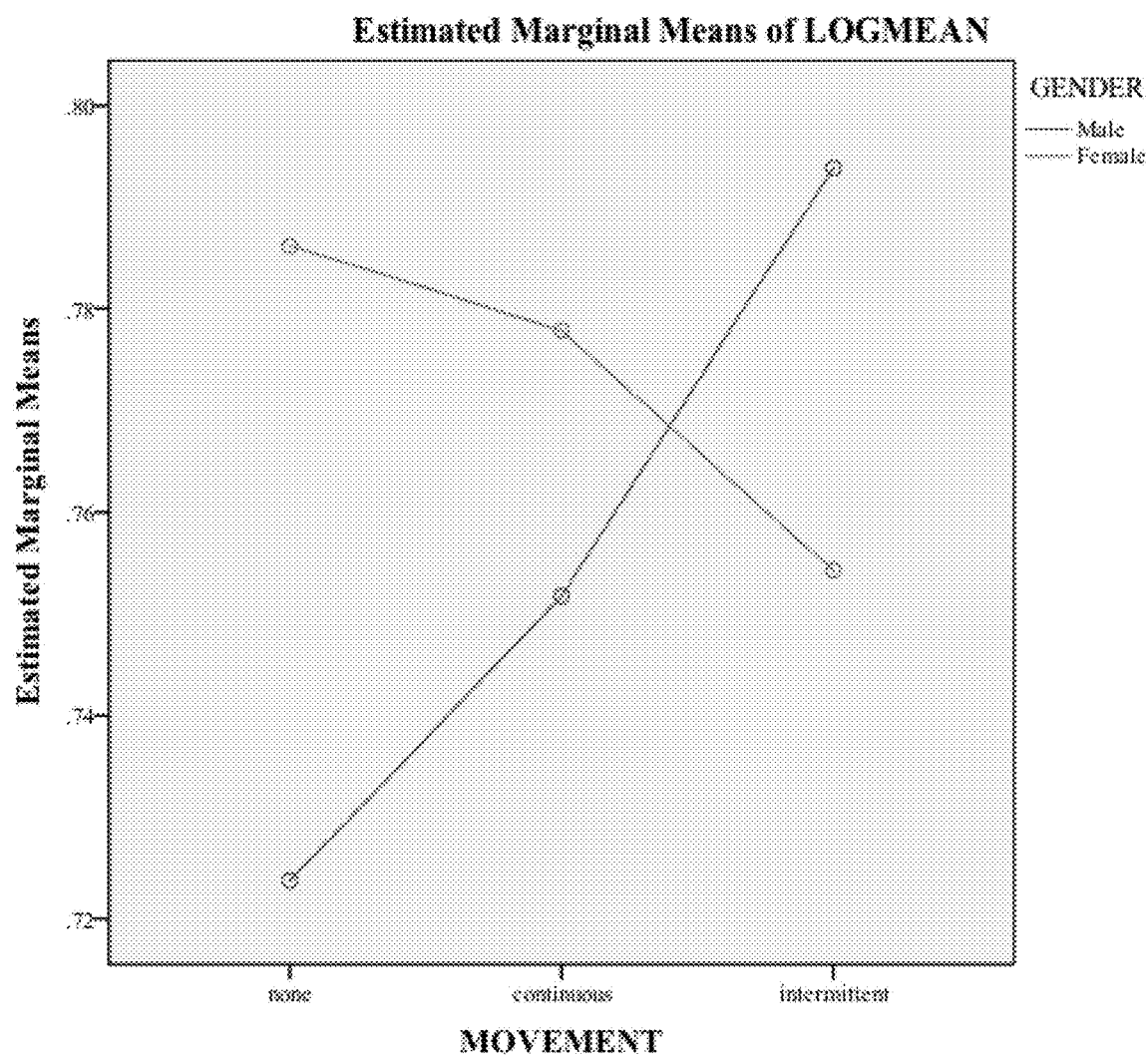
FIG. 8 is a chart showing the estimated marginal means of time to complete a task for each gender as mapped against, no movement, continuous movement and intermittent non-biological movement.
Figure 9:
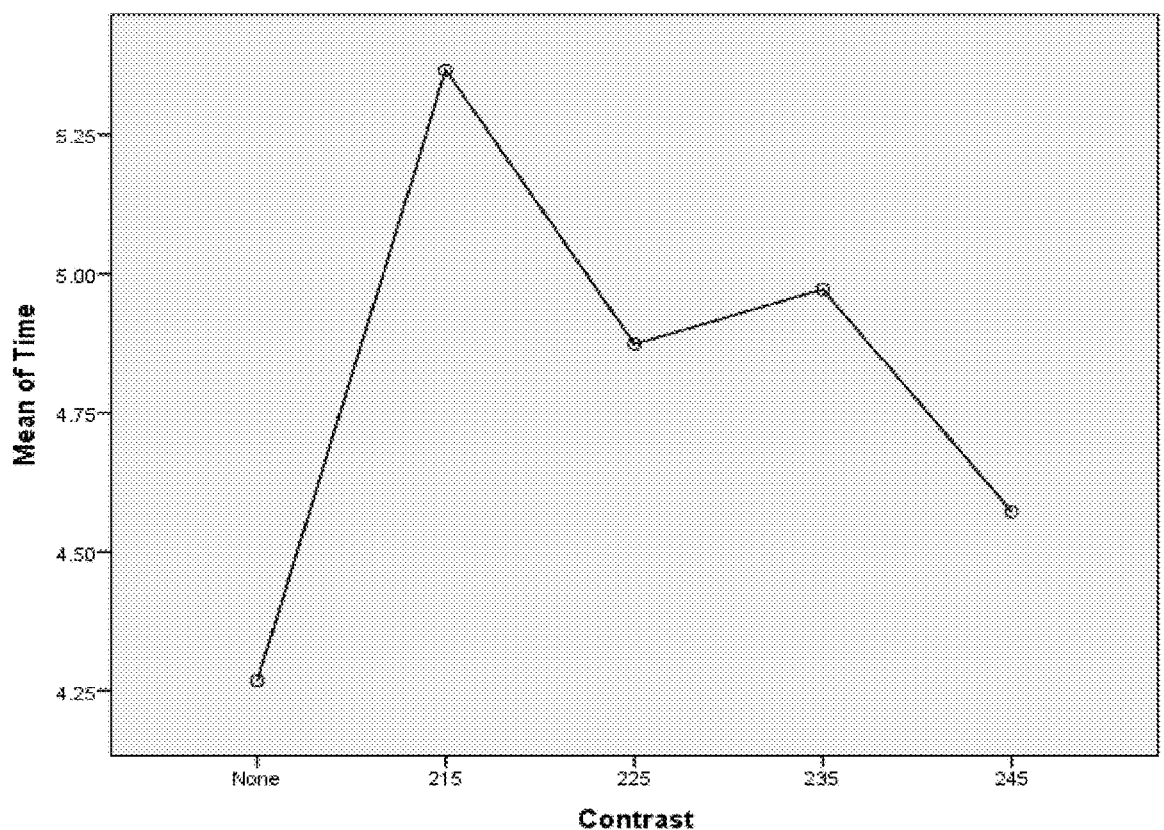
FIG. 9 is a chart showing the mean of time to complete a task mapped against varying levels of contrast of intermittent non-biological movement.

Additionally, the inventor's testing is further exampled in FIGS. 7-10. These charts show the empirical results of the experiments with certain variables correlated with the task complete times. For example, FIG. 7 shows the differences in the mean times to complete a task both with and without the repetitive, non-biological movement for each gender. FIG. 8 shows the differences in the mean times to complete a task for each gender when the non-biological movement was varied from off, to continuous, to intermittent. This intermittent time could vary from an on/off laps of 0-20 seconds, 0-10 seconds, or 0-5 seconds, which was tested. FIG. 9 charts the differences in the mean times to complete a task when the contrast of the non-biological movement varied on the display. Finally, FIG. 10 explains that the age of the individual viewing the non-biological movement and the task is a covariate, or predictor of success in the speed of completion of the task.

Even though the results may be varied, the common denominator is that the inventor could actively change cognitive load levels through the use of movement. The use of movement is effective for viewing from the center of vision all the way out to the periphery. The factors of the location of the movement, what is the movement, and the properties of that movement when it is presented changes the results of the central task attempted.

Other variable could be a factor in determining the best display factors for the movement. For example, the direction and speed of the movement can be important, especially if the direction and speed support or refute the non-biological nature of the movement. Other factors include the color, contrast, size, and shape of the object moving. Characteristics of the movement itself can also be a factor in the effectiveness of the change in cognitive function by this method and system. For example, the frequency of the movement of the objects, the quantity of objects moving and the density of the objects on the display can be altered to maximize or minimize cognitive function in the individual. Further, the frequency of the appearance of the object moving can be adjusted in relation to the flicker fusion threshold, or flicker fusion rate, to maximize or minimize cognitive function in the individual. The flicker fusion threshold the frequency at which an intermittent light stimulus appears to be completely steady to the average human observer.

The preferred embodiment of the method and system would include an object specifically picked by one or more of color, contrast, size, shape and quantity. That object(s) would could then selected to be moved in a direction, at a speed, and/or in a frequency to maximize or minimize cognitive function in the individual as desired by the administrator of the method and/or system.

Other sensory aspects can be introduced to maximize or minimize cognitive function in the individual. For example various sounds, smells, tactile sensations, or tastes could be introduced with the movement to further alter the cognitive load on the individual. A preferred embodiment of the method and system would be to add one or more stimuli to the other senses of the individual experiencing the movement that could further influence the cognitive abilities of that individual.

As previously mentioned, characteristics of the individual, or observer of the display, can affect the effectiveness of the movement in altering the cognitive load and completion time of the task or comprehension of the information provided. The inventor's experiments showed that age of the individual as well as gender affected the results. Other factors of the individual him/herself can be used in determining the best object and movement of that object to result in the desired change in cognitive load. These demographic variables can include the afore mentioned gender and age, and could further include some single selection or combination of the emotional status, fatigue, race, ethnicity, education level, current health status, and even the time of day of the observation by the individual. Again, a preferred embodiment of the method and system would be to adjust the movement based upon one or more the demographic variables of the individual to further influence the cognitive abilities of the individual experiencing the movement.

Collectively, the method and system could be constructed such that the specific object used and the movement of the object used would be selected and adjusted for the demographic variables. The other sensory aspects and stimuli could be added to further influence the cognitive ability of the individual.

Uses of this method and/or system can be many. For example, uses of this method and/or system could be to manipulate the time a viewer spends viewing an advertisement and/or the number of advertisement inquiries (or clicks) that can be generated with the inventive method and/or system. Additional uses of this method and/or system could be to train professionals to focus attention and compete task in their work environment. For example, medical professionals could use the method and/or system to increase focus and process times when providing the medical services—e.g. during surgeries. Pilots could use the method and/or system to improve flight training. Educators could use the method and/or system to increase the focus and process times of students. The method and/or system could be used as a sleep aid by increasing the calming effect of the individual viewing the display.

The computer readable memory 30 can work in conjunction with other memory media to provide the instructions to the display screens 24, 26, and 32. For example storage media can store the data and instructions that will be used to display on the display screens 24, 26, and 32. Transmission media can be used to link the processor 28, computer readable memory 30, and any storage media. Additionally, a host server can be connected to the processor 28 and/or the computer readable memory 30 through a communications network to provide data and instructions to the system and to support interactivity between the instructor and user of the system. The communications network can also provide access to a platform for the system to support interactivity between the instructor and user of the system.

Also disclosed herein is headwear 40 for reducing the cognitive load in a user 12. Again, the user can be similar to the user for the system 10 and can have the field of vision 14, center vision 16, right eye peripheral vision 18, and left eye peripheral vision 20. The headwear 40 can include a frame 50 shaped to be positioned on the head of the user 12. The frame 50 can be various frames and devices known to be placed on a head of a person, including, but not limited to, a hat, cap, eyewear, eye glasses, sunglasses, and the like. The frame needs to be able to be placed around the head and position display devices proximate to the field of vision 14 of the user 12.

The headwear 40 can further include the displays 54 and 56, similar in function to the display screens 24 and 26, which are sized to be attached to the frame 52. Further, the processor 28 and a computer readable memory 30 can also be operatively attached to the frame 52. Further, the headwear can include a third display 62, similar in function to the display screen 32, that is sized to be attached to the frame 52 and interact with the processor 28, computer readable memory 30, and displays 54 and 56. The displays 54 and 56 can be configured as previously described to block various portions of the right eye peripheral vision 18 and left eye peripheral vision 20 in the various positions and at the angled degrees from the center of vision 16 as previously discussed.

Figure 4A:
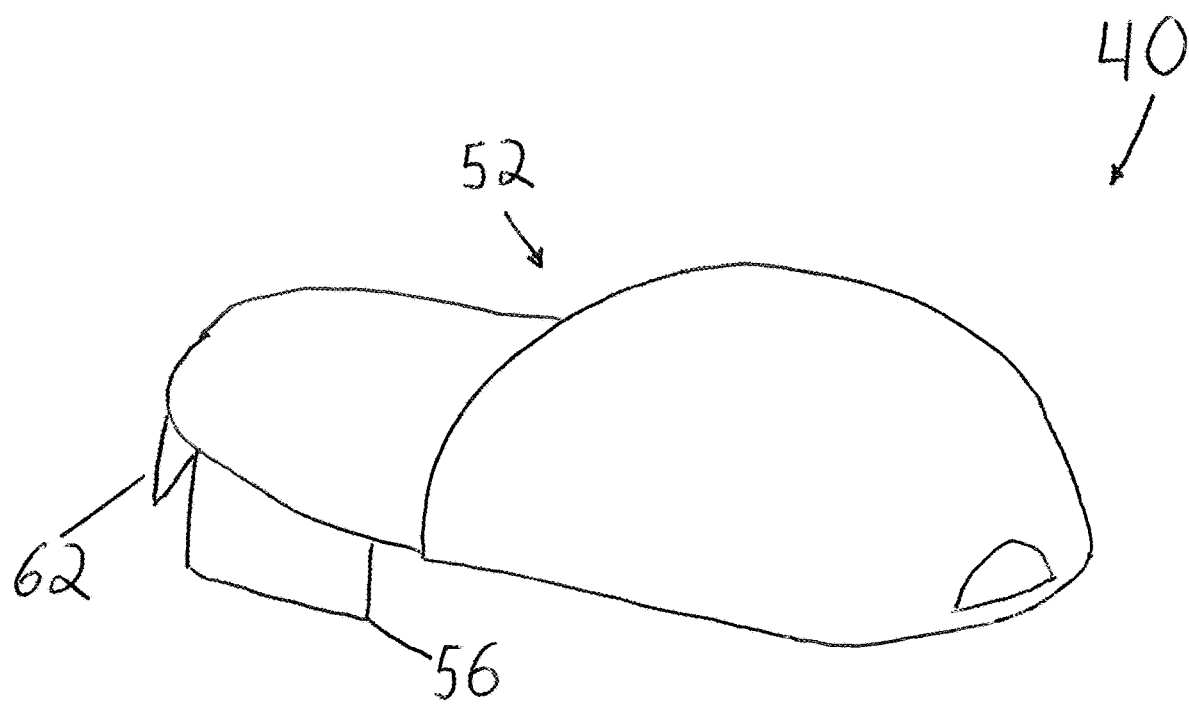
FIG. 4A is back perspective view of an example of headwear made in accordance with the current disclosure.
Figure 4B:
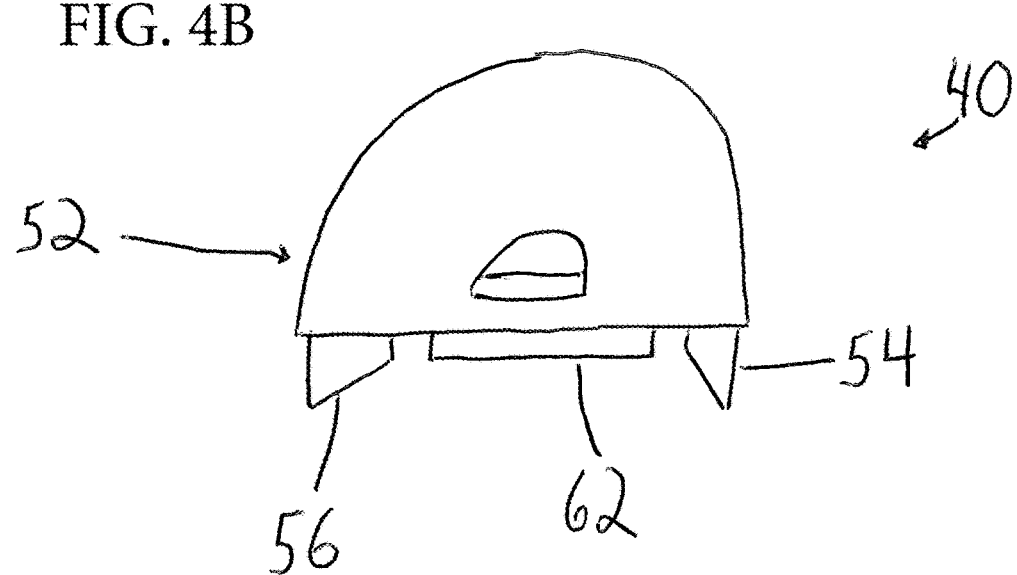
FIG. 4B is back view of an example of headwear made in accordance with the current disclosure.
Figure 4C:
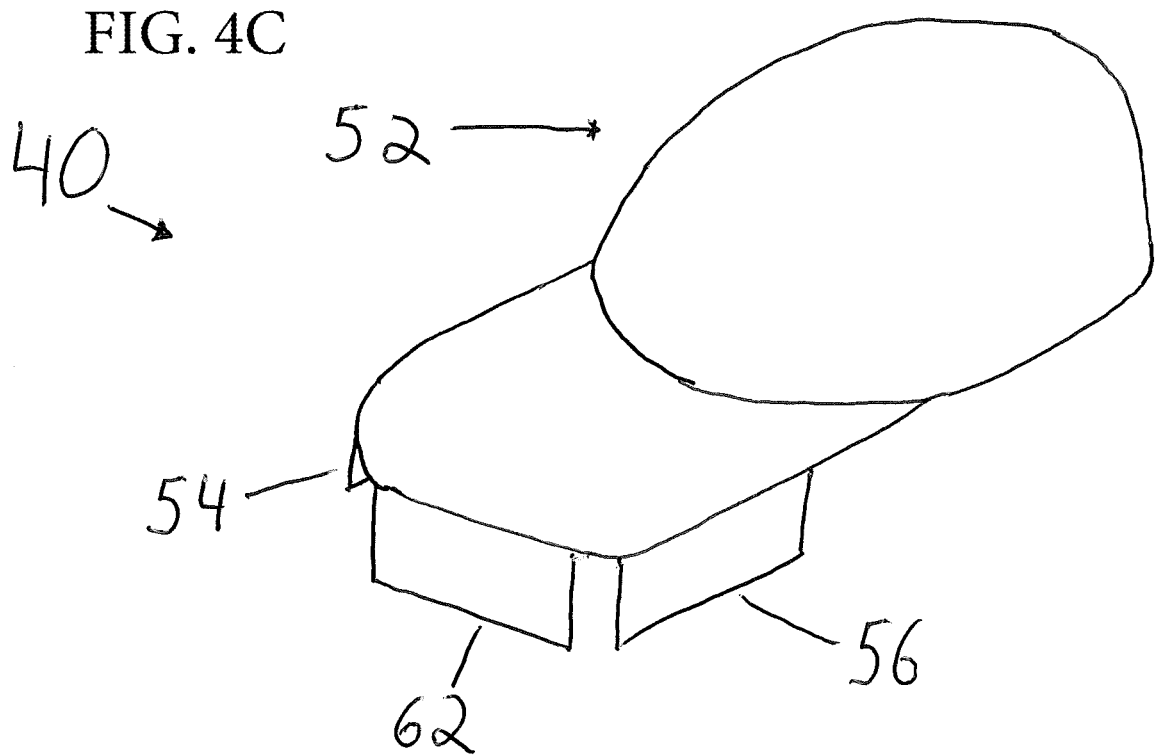
FIG. 4C is front perspective view of an example of headwear made in accordance with the current disclosure.
Figure 4D:
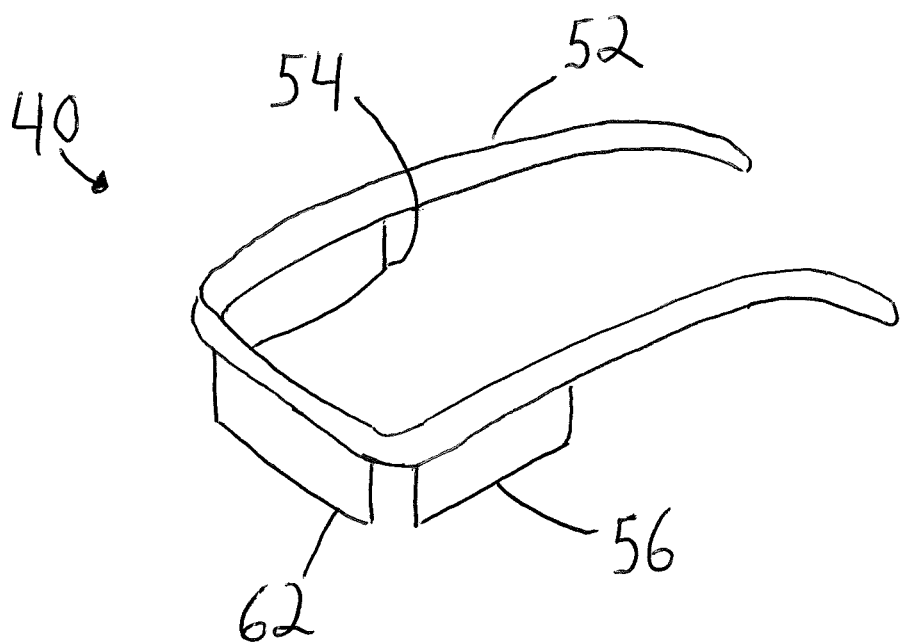
FIG. 4D is front perspective view of an example of headwear made in accordance with the current disclosure.
Figure 4E:
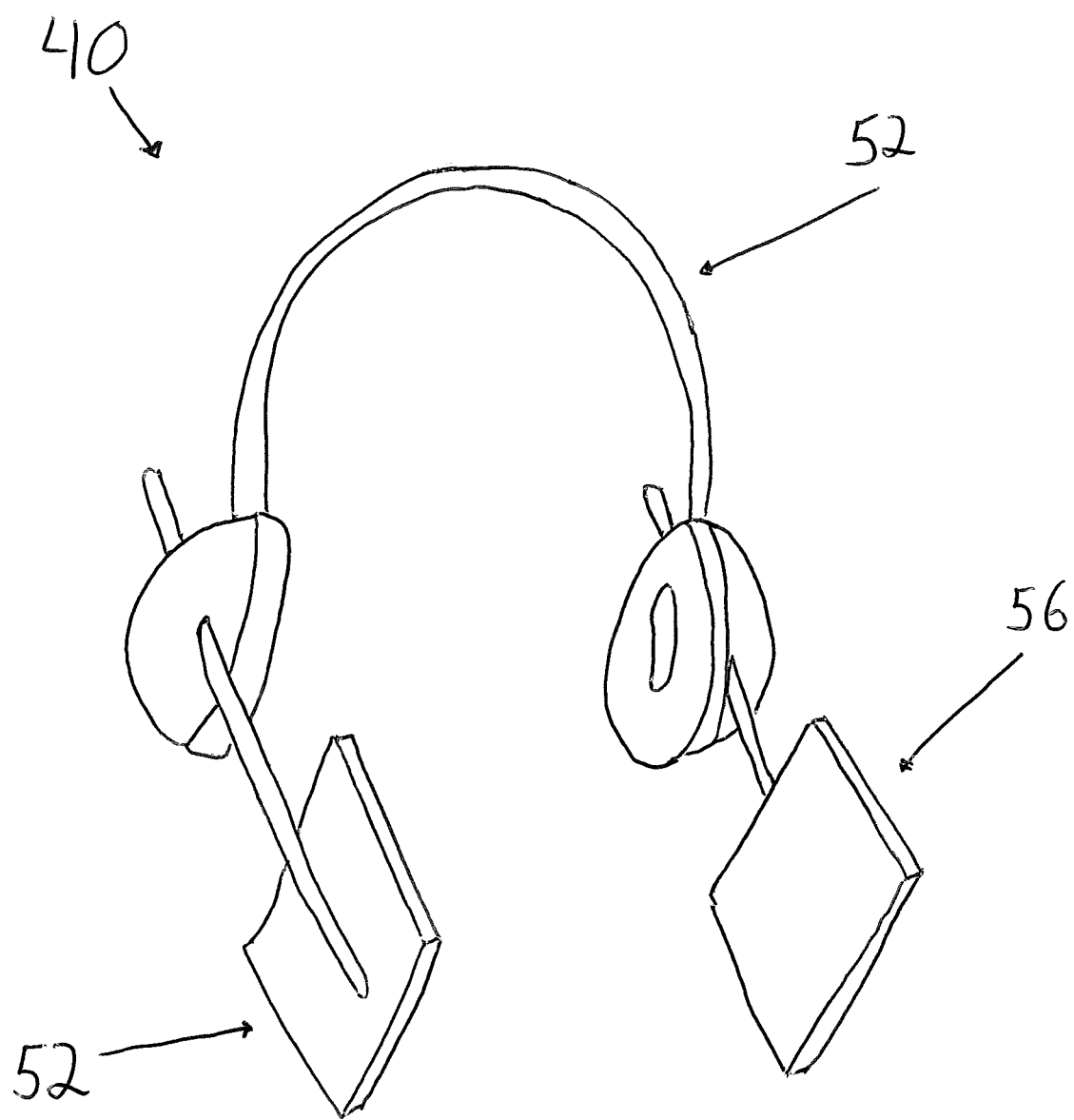
FIG. 4E is front perspective view of an example of headwear made in accordance with the current disclosure.

In another embodiment the system 10 and/or headwear 40 can include noise adjusting or noise cancelling audio features. These audio features can include speaker or headphones that results in a dual-mode solution with both hearing and vision addressed. For example, as seen in FIG. 4E, earphones can be used on the frame 52 of the headwear 40. The earphones could be of the noise canceling type. Alternately the earphone could produce audio canceling sound, e.g. "white noise" to further reduce possible distractions to the user and lower the cognitive load on that use. Speaker as well as headphones could be used in the system 10 for the same purpose.

The display screens 24 and 26 can be attached to the support 22 while the displays 54 and 56 can be attached to the frame 52 to block aspects of the vertical peripheral vision range. In this type of embodiment, the display screens can either be enlarged and/or curved to block this vertical peripheral range. Alternately, a fourth and/or fifth display screen or display can be used to block the peripheral vision extending towards the crown of the head or the peripheral vision extending towards the chin from the eyes. This could further reduce the cognitive load on a user 12 and increase the cognitive function of that user 12. In the displays that block the vertical peripheral vision, repetitive non-biological movement can also be introduced by the processor 28 through the computer readable memory medium 30 through the processor 28 to induce a stronger cognitive focus on the task and/or information presented to the user 12.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure. Further, the particular embodiments previously described are not intended to be construed as limitations upon the scope of this disclosure.

What is claimed is:

1. A system for reducing the cognitive load in a user, the user having a field of vision, a center of vision, a right eye peripheral vision and a left eye peripheral vision, the system comprising:
   a support shaped to be position in front of the user and proximate to the field of vision;
   a first display screen attached to the support and positioned in the right eye peripheral vision;
   a second display screen attached to the support and positioned in the left eye peripheral vision;
   a third display screen operatively attached to the support, the third display screen positioned between the first display screen and the second display screen and proximate to the center of vision;
   a processor operatively attached to the support, the first display screen, the second display screen, and the third display screen; and
   computer-readable memory medium accessible by the processor and configured to instruct the first display screen and the second display screen to display repetitive, non-biological movement, and to instruct the third display screen to display both repetitive, non-biological movement and either information or an operating task.

2. The system of claim 1, wherein the first display screen substantially blocks the right eye peripheral vision and the second display screen substantially blocks the left eye peripheral vision.

3. The system of claim 1, wherein:
the right eye peripheral vision includes a horizontal field range of 100 degrees measured from the center of vision; and
the left eye peripheral vision includes a horizontal field range of 100 degrees measured from the center of vision.

4. The system of claim 3, wherein the first display screen blocks the right eye peripheral vision from 20 to 95 degrees and the second display screen blocks the left eye peripheral vision from 20 to 95 degrees.

5. The system of claim 4, wherein the first display screen blocks the right eye peripheral vision from 20 to 90 degrees and the second display screen blocks the left eye peripheral vision from 20 to 90 degrees.

6. The system of claim 5, wherein the first display screen blocks the right eye peripheral vision from 50 to 90 degrees and the second display screen blocks the left eye peripheral vision from 50 to 90 degrees.

7. The system of claim 6, wherein the first display screen blocks the right eye peripheral vision from 70 to 90 degrees and the second display screen blocks the left eye peripheral vision from 70 to 90 degrees.

8. The system of claim 3, wherein the third display screen is approximately positioned in the right eye peripheral vision from 0 to 20 degrees and in the left eye peripheral vision from 0 to 20 degrees.

9. A system for reducing the cognitive load in a user, the user having a field of vision, a center of vision, a right eye peripheral vision a horizontal field range of 100 degrees measured from the center of vision, and a left eye peripheral vision having a horizontal field range of 100 degrees measured from the center of vision, the system comprising:
a support shaped to be position in front of the user and proximate to the field of vision
a central display screen attached to the support, the central display screen approximately positioned in the right eye peripheral vision from 0 to 20 degrees and in the left eye peripheral vision from 0 to 20 degrees;
a processor operatively attached to the support and the central display screen; and
computer-readable memory medium accessible by the processor and configured to instruct the central display screen to display either information or an operating task and to display repetitive, non-biological movement around the information or operating task.

10. The system of claim 9, wherein the central display screen is positioned proximate to the center of vision.

11. The system of claim 9, further including:
a first display screen attached to the support and positioned in the right eye peripheral vision to at least partially block the right eye peripheral vision;
a second display screen attached to the support and positioned in the left eye peripheral vision to at least partially block the left eye peripheral vision.

12. The system of claim 11, wherein the first display screen blocks the right eye peripheral vision from 20 to 95 degrees and the second display screen blocks the left eye peripheral vision from 20 to 95 degrees.

13. The system of claim 11, wherein the first display screen blocks the right eye peripheral vision from 20 to 90 degrees and the second display screen blocks the left eye peripheral vision from 20 to 90 degrees.

14. The system of claim 11, wherein the first display screen blocks the right eye peripheral vision from 50 to 90 degrees and the second display screen blocks the left eye peripheral vision from 50 to 90 degrees.

15. The system of claim 11, wherein the first display screen blocks the right eye peripheral vision from 70 to 90 degrees and the second display screen blocks the left eye peripheral vision from 70 to 90 degrees.

16. A system for reducing the cognitive load in a user, the user having a field of vision, a center of vision, a right eye peripheral vision and a left eye peripheral vision, the system comprising:
a support shaped to be position in front of the user and proximate to the field of vision;
a central display screen operatively attached to the support, the central display screen positioned proximate to the center of vision a processor operatively attached to the support and the third display screen; and
computer-readable memory medium accessible by the processor and configured to instruct the third display screen to display both repetitive, non-biological movement and either information or an operating task.

17. The system of claim 16, wherein:
the right eye peripheral vision includes a horizontal field range of 100 degrees measured from the center of vision;
the left eye peripheral vision includes a horizontal field range of 100 degrees measured from the center of vision; and
the central display screen is approximately positioned in the right eye peripheral vision from 0 to 20 degrees and in the left eye peripheral vision from 0 to 20 degrees.

* * * * *